(12) United States Patent
Kim et al.

(10) Patent No.: US 7,995,061 B2
(45) Date of Patent: Aug. 9, 2011

(54) DISPLAYING OF ITEM THROUGH ELECTRONIC APPARATUS

(75) Inventors: Tae Hun Kim, Seoul (KR); Jeong Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 820 days.

(21) Appl. No.: 12/040,563

(22) Filed: Feb. 29, 2008

(65) Prior Publication Data

US 2008/0218534 A1 Sep. 11, 2008

(30) Foreign Application Priority Data

Mar. 9, 2007 (KR) .................. 10-2007-0023435

(51) Int. Cl.
*G06T 11/20* (2006.01)
(52) U.S. Cl. ...................................... 345/440
(58) Field of Classification Search .................. 345/581, 345/440, 659
See application file for complete search history.

(56) References Cited

U.S. PATENT DOCUMENTS

| | | | | |
|---|---|---|---|---|
| 6,828,964 | B2 * | 12/2004 | Fujita et al. | 345/419 |
| 7,184,051 | B1 * | 2/2007 | Matsumoto et al. | 345/581 |
| 7,627,831 | B2 * | 12/2009 | Chiu et al. | 715/767 |
| 2002/0067373 | A1 * | 6/2002 | Roe et al. | 345/762 |
| 2003/0001906 | A1 * | 1/2003 | Light et al. | 345/849 |
| 2003/0090184 | A1 * | 5/2003 | Webb | 312/319.9 |

FOREIGN PATENT DOCUMENTS

| CN | 1429046 A | 7/2003 |
|---|---|---|
| CN | 1695106 A | 11/2005 |
| CN | 1791251 A | 6/2006 |

* cited by examiner

*Primary Examiner* — Ryan R Yang
(74) *Attorney, Agent, or Firm* — Birch, Stewart, Kolasch & Birch, LLP

(57) ABSTRACT

An electronic apparatus, a computer program product and a method of displaying an item using the same are provided. The electronic apparatus includes a memory for storing an item list having at least one item, a display for displaying at least one object capable of fluidly moving and corresponding to the at least one item respectively and a controller for controlling the display to change a fluid movement of a specific object corresponding to a specific item when an event related to the specific item among the at least one item occurs.

27 Claims, 11 Drawing Sheets h3, h4 = Setting time point − Current time point

DISPLAYING OF ITEM THROUGH ELECTRONIC APPARATUS

CROSS REFERENCE TO RELATED APPLICATIONS

This application claims priority under 35 U.S.C. §119(a) on Patent Application No. 10-2007-0023435 filed in Republic of Korea on Mar. 9, 2007, the entire contents of which are hereby incorporated by reference.

BACKGROUND

1. Field of Invention

This document relates to an electronic apparatus, a computer program product and a method of displaying an item using the same that can display various items using an object that can fluidly move.

2. Related Art

Electronic apparatuses in the related art display various items such as a menu or a file in a monotonous icon shape. Therefore, conventional methods of displaying an item in the electronic apparatuses in the related art cannot provide fun and sensitivity to a user.

Particularly, users familiar with various electronic apparatuses require new Graphical User Interface (GUI). There exists a need for a new type of user interface.

SUMMARY

An aspect of this document is to provide an electronic apparatus, a computer program product and a method of displaying an item such as a menu or a file using an object that can fluidly move, such as via a fluid layer or a waterdrop.

Another aspect of this document is to provide an electronic apparatus, a computer program product and a method of displaying an object that can fluidly move in response to various events that may occur in the electronic apparatus.

Another aspect of this document is to provide an electronic apparatus, a computer program product and a method of displaying various functions provided by an electronic apparatus using an object that can fluidly move.

In one general aspect, an electronic apparatus of one embodiment of the invention comprises a memory for storing an item list having at least one item; a display for displaying at least one object capable of fluidly moving and corresponding to the at least one item respectively; and a controller for controlling the display to change a fluid movement of a specific object corresponding to a specific item when an event related to the specific item among the at least one item occurs.

The object may be displayed in a shape of one or more fluid layers or one or more waterdrops.

The item may comprise a menu or a file.

The event may comprise reception of a selection signal or an execution instruction signal of the specific item through an input provided in the electronic apparatus.

The event may comprise reception of data related to the specific item from the outside of the electronic apparatus through a radio frequency (RF) unit provided in the electronic apparatus.

In another aspect, there is an electronic apparatus that comprises a display for displaying a fluid that has a predetermined height or predetermined bulk and whose boundary dynamically moves; a power supply for supplying power; and a controller for controlling the display to change a height or bulk of the displayed fluid according to a change of a residual charge amount of the power supply.

In yet another aspect, there is an electronic apparatus that comprises a display for displaying a fluid that has a predetermined height or predetermined bulk and whose boundary dynamically moves; a memory for storing a setting time point related to a specific function; and a controller for controlling to change a height or bulk of the displayed fluid according to a difference between the setting time point and a current time point.

In another aspect, there is an electronic apparatus that comprises a display for displaying a fluid that has a predetermined height or predetermined bulk and whose boundary dynamically moves; and a controller for controlling the display to display at least one icon at the inside of an area in which the fluid is displayed, wherein the at least one icon indicates at least one function, respectively, executed in a background state.

In yet another aspect, there is a method and a corresponding computer program product for displaying an item in an electronic apparatus, where the method comprises displaying at least one object capable of fluidly moving and corresponding to at least one item, respectively; and detecting occurrence of an event related to a specific item among the at least one item; and changing, when the event occurs, fluid movement of a specific object corresponding to the specific item.

Further features will be apparent from the following description, comprising the drawings, and the claims.

BRIEF DESCRIPTION OF THE DRAWINGS

The details of one or more implementations are set forth in the accompanying drawings and the description below. In the entire description of this document, like reference numerals represent corresponding parts throughout various figures.

DETAILED DESCRIPTION

Hereinafter, exemplary implementations of an electronic apparatus, a computer program product and a method of displaying an item will be described in detail with reference to the accompanying drawings. In describing this document, when it is regarded that descriptions about a related well-known function or configuration are not necessary for understanding a major point of this document, individual descriptions thereof are omitted.

Figure 1:
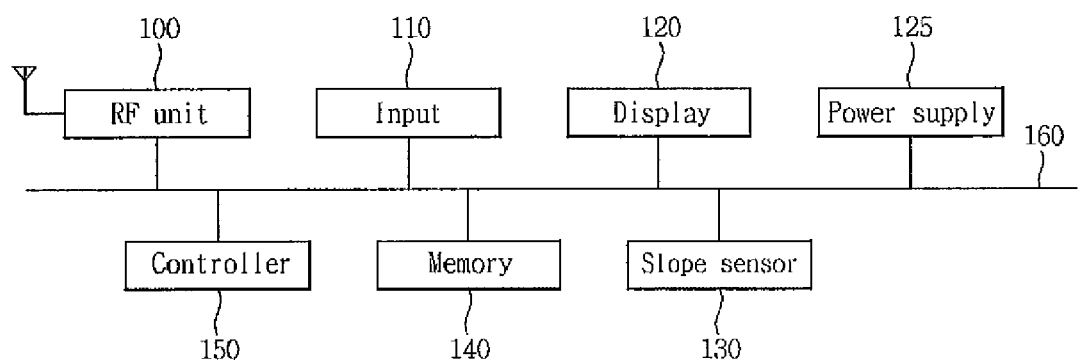
FIG. 1 is a block diagram illustrating a configuration of an electronic apparatus in an implementation.
Figure 2:
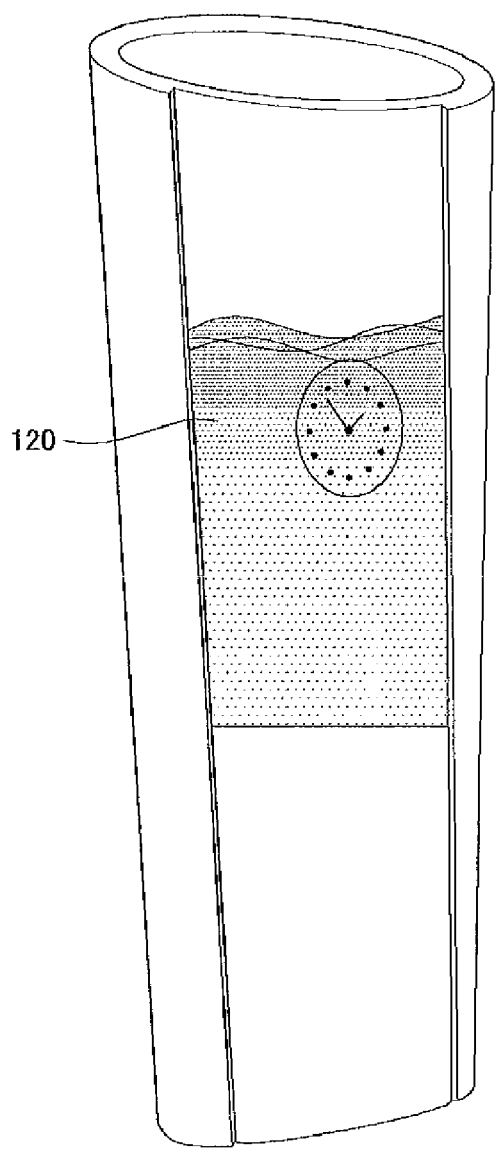
FIG. 2 is a perspective view illustrating an external shape of an electronic apparatus in an implementation.

FIG. 1 is a block diagram illustrating a configuration of an electronic apparatus in an implementation. FIG. 2 is a perspective view illustrating an external shape of an electronic apparatus in an implementation. The electronic apparatus shown in FIG. 2 is a mobile phone. Referring to FIGS. 1 and 2, the electronic apparatus in an implementation is described in detail.

The electronic apparatus in an implementation comprises a radio frequency (RF) unit 100, an input 110, a display 120, a power supply 125, a slope sensor 130, a memory 140, and a controller 150. The units are connected by a bus 160.

The RF unit 100 is a wireless communication device for transmitting to and receiving data from a predetermined wireless communication network. The wireless communication network comprises, for example, a mobile communication network, such as a Code Division Multiple Access (CDMA) or a Global System for Mobile Communications (GSM) and a broadcasting network.

The input 110 is a device for receiving various information or instructions from a user and uses a keypad comprising various numeric keys and directional keys or a touch screen.

The display 120 is a display device for displaying various information or a state of an electronic apparatus by a control signal output from the controller 150. The display 120 may be embodied with a touch screen for simultaneously performing a function of the input 110.

The power supply 125 is a device for supplying power required for operating the electronic apparatus. The power supply 125 may comprise a battery.

The slope sensor 130 is a device for detecting a slope change of a body of the electronic apparatus. The slope sensor 130 can use one of a gravity detection sensor, a slope detection sensor, and an acceleration sensor.

The memory 140 stores a predetermined program for controlling general operations of an electronic apparatus and stores, when general operations of the electronic apparatus is performed by the controller 150, input/output data and various processed data.

Particularly, the memory 140 can store an item list comprising at least one item. The item may be a menu or a file. The menu can be formed in a tree structure having a plurality of hierarchies. A specific hierarchy of the each tree structure can comprise a menu list comprising at least one menu. The file comprises, for example, an image file, a moving picture file, and a text file.

The controller 150 controls the units and performs general operations of the electronic apparatus in an implementation.

The controller 150 controls the display 120 to display at least one object that can fluidly move and corresponding to at least one item comprised in a specific item list stored in the memory 140. The controller 150 can change, when an event related to a specific item of the at least one item is occurred, fluid movement of a specific object corresponding to the specific item.

Figure 3:
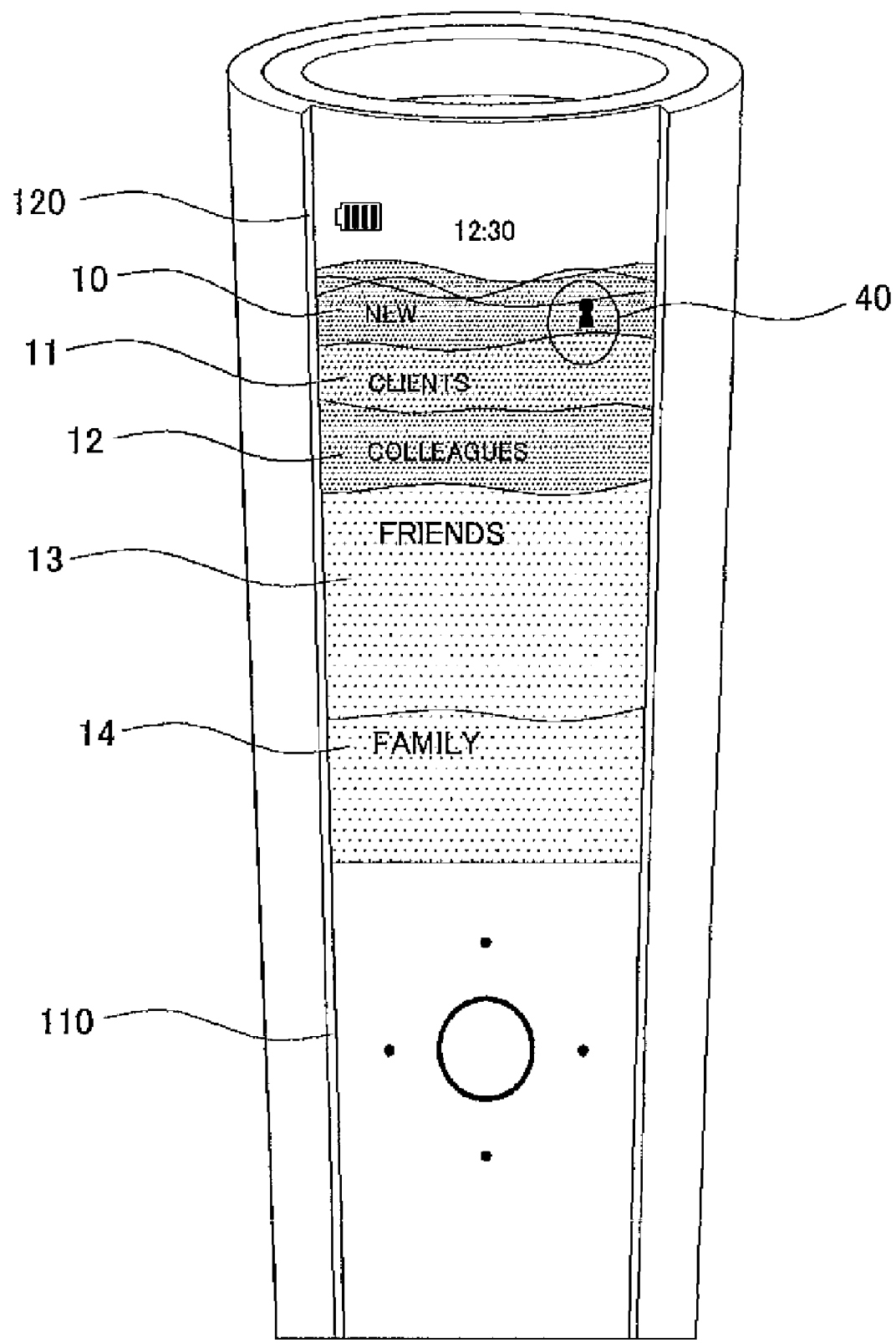
FIG. 3 illustrates an example of a screen in which an object is displayed with a fluid layer in an implementation.
Figure 4:
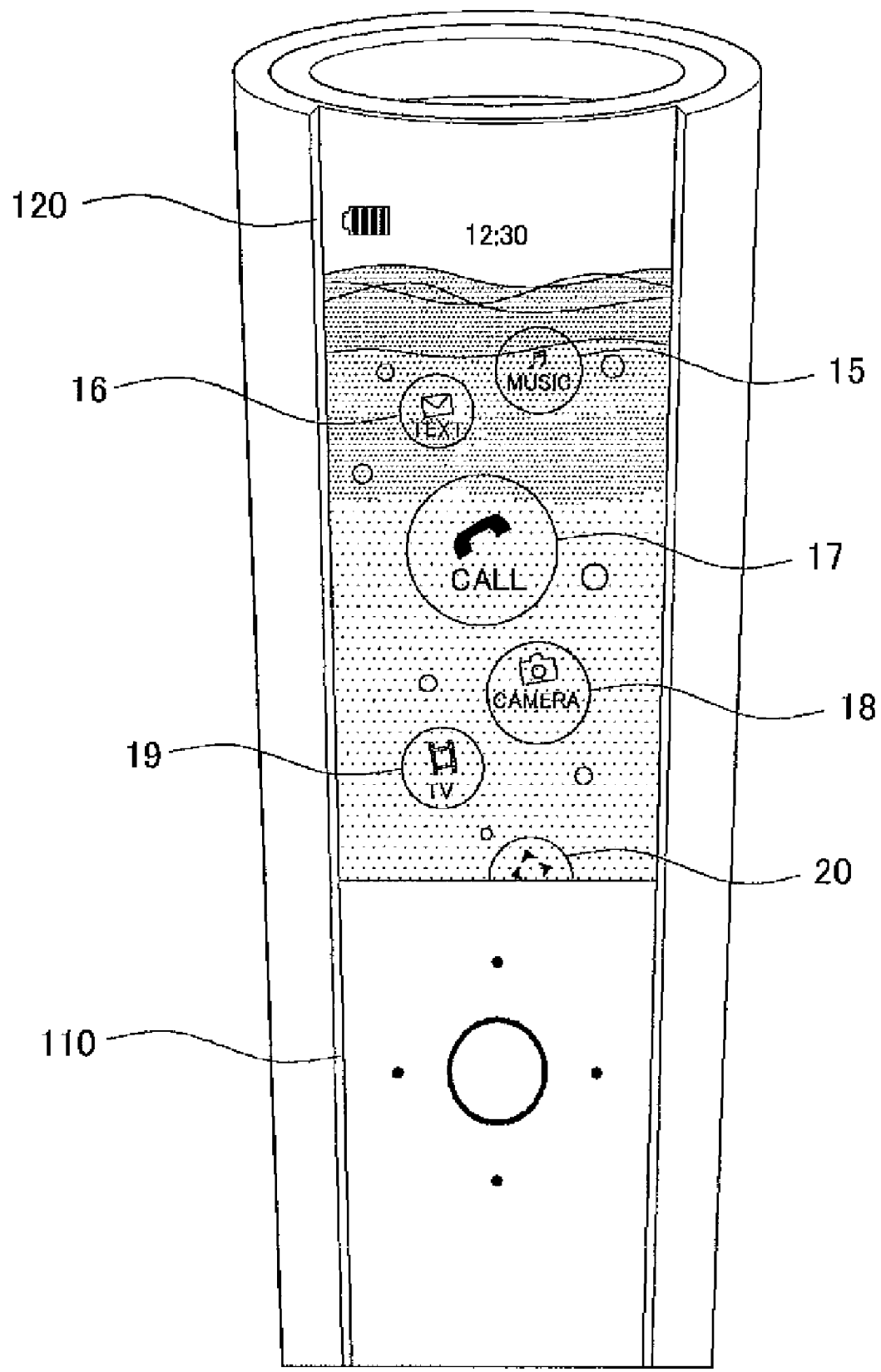
FIG. 4 illustrates an example of a screen in which an object is displayed with a waterdrop in an implementation.

The object can be displayed with a shape of a fluid layer or a waterdrop as a representative example that can fluidly move in nature. The fluid layer or the waterdrop can be displayed in the display 120 in a way similar to how a liquid exists in nature. FIG. 3 illustrates an example of a screen in which an object is displayed with a fluid layer. FIG. 4 illustrates an example of a screen in which an object is displayed with a waterdrop. Detailed operations of the object, fluid movement of the object, the event, and the controller 150 are described relative to the following method(s) of displaying.

Figure 5:
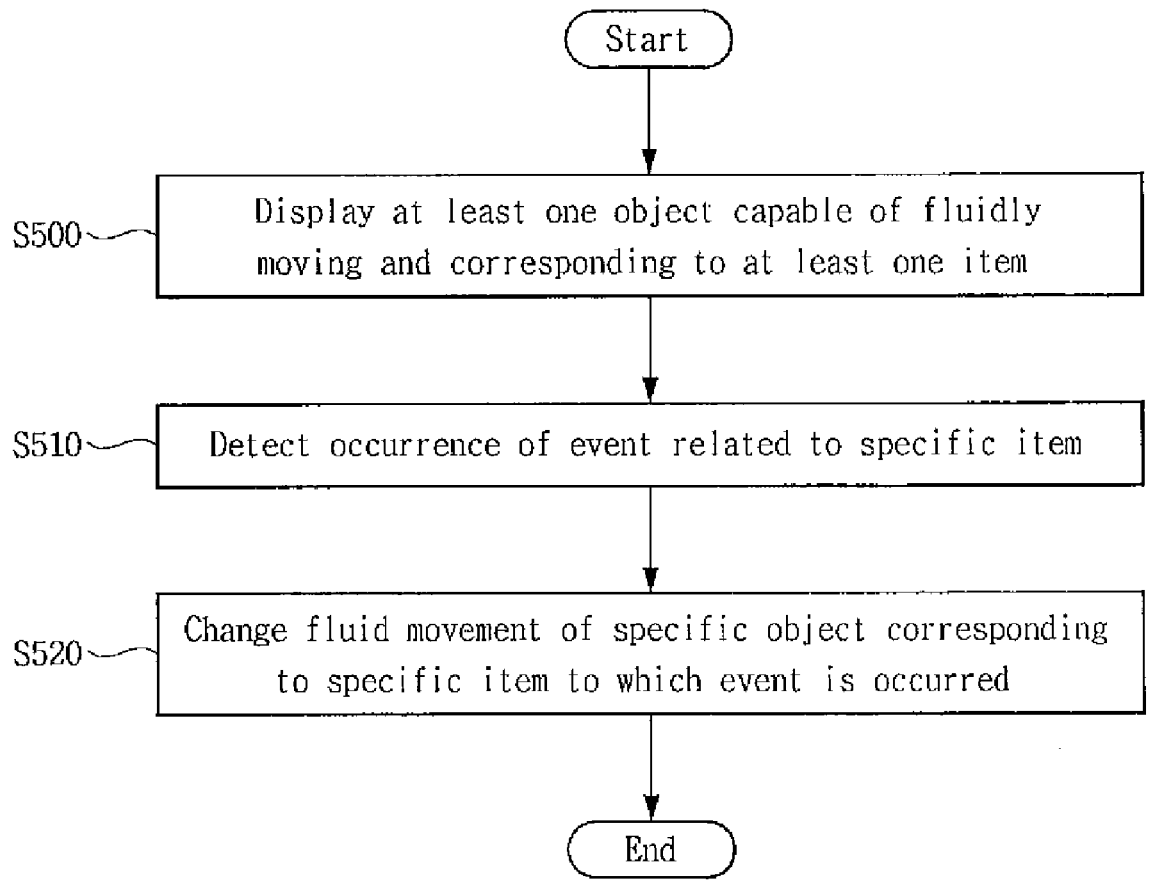
FIG. 5 is a flowchart illustrating a method of displaying an item in an electronic apparatus in an implementation.

FIG. 5 is a flowchart illustrating a method of displaying an item in an electronic apparatus.

The controller 150 controls the display 120 to display at least one object that can fluidly move on the display 120 and that corresponds to at least one item, respectively stored in the memory 140 (S500).

In FIGS. 3 and 4, reference numerals 10 to 20 indicate specific objects corresponding to specific items, respectively. For example, objects 10, 11, 12, 13, and 14 displayed with the fluid layer in FIG. 3 correspond to menus of "NEW", "CLIENTS", "COLLEAGUES", "FRIENDS", and "FAMILY", respectively. The menus shown in FIG. 3 are examples of menus belonging to a phonebook 40. Further, for example, objects 15, 16, 17, 18, 19, and 20 displayed with a waterdrop in FIG. 4 correspond to menus of "MUSIC", "TEXT", "CALL", "CAMERA", "TV", and "NAVI", respectively. Menus shown in FIG. 4 are example of menus belonging to a main menu, which is a top-level hierarchy in a menu structure.

Objects 10 to 20 shown in FIGS. 3 and 4 can fluidly move in the display 120. For example, objects 10 to 14 displayed with a fluid layer in FIG. 3 can be displayed as fluidly moving similarly to how water flows. Further, for example, objects 15 to 20 displayed with the waterdrop in FIG. 4 can move while changing a size thereof like a waterdrop or a bubble existing in water. In other embodiments, the fluid may have a viscosity different than water, so that the objects flow slower or faster than an object in water.

Objects displayed with a shape of the fluid layer or the waterdrop can be displayed using two-dimensional or three-dimensional graphic.

According to a using frequency of the each item or an information amount related to the each item, the controller 150 can control the display 120 so that a size of the each object corresponding to the each item is differently displayed. For example, in FIG. 3, because the fluid layer 13 corresponding to a menu "FRIENDS" is displayed with a largest size, it can be seen that the quantity of phone numbers stored in the menu "FRIENDS" is largest. Further, for example, if a menu in which the user usually uses with a largest number of times among main menus is "CALL," a waterdrop 17 corresponding to the menu "CALL" is displayed with a largest size, as shown in FIG. 4

Further, according to a using frequency of the each item or an information amount related to the each item, the controller 150 can control the display 120 so that a relative position of the each object corresponding to the each item changes. For example, in FIG. 4, it can be seen that a using frequency of a menu "MUSIC" corresponding to a waterdrop 15 positioned at the highest position is largest and a using frequency of menus "TV" and "NAVI" corresponding to waterdrops 19 and 20, respectively positioned at a lower position is small. Alternatively, an object corresponding to an item having a smallest using frequency may be positioned at the highest position.

A relative position of the each object may be set by the user through the input 110.

The controller 150 detects occurrence of the event related to a specific item of at least one item (S510).

The event can comprise all events that is related to the specific item and that may occur in an electronic apparatus. The event comprises the following examples.

First, the event may be reception of a selection signal or an execution instruction signal of the specific item through the input 110. For example, in FIG. 3, when the display 120 uses a touch screen, if the user touches a menu "NEW", an event selected by the menu "NEW" or an event for instructing execution of the menu "NEW" occurs.

Second, the event may be reception of data related to the specific item from the outside of the electronic apparatus through the RF unit 100. For example, in FIG. 4, when the electronic apparatus is a mobile phone and a Short Message Service (SMS) message is received through the RF unit 100, an event of receiving data related to a menu "TEXT" occurs. Further, for example, in FIG. 4, when the electronic apparatus is a mobile phone and receives a call through the RF unit 100, an event of receiving data related to a menu "CALL" occurs.

As the event occurs, the controller 150 changes fluid movement of a specific object corresponding to a specific item in which the event occurs (S520). When an execution instruction signal of the specific item receives, the controller 150 can control the display 120 to display an execution screen of the specific item.

Figure 6:
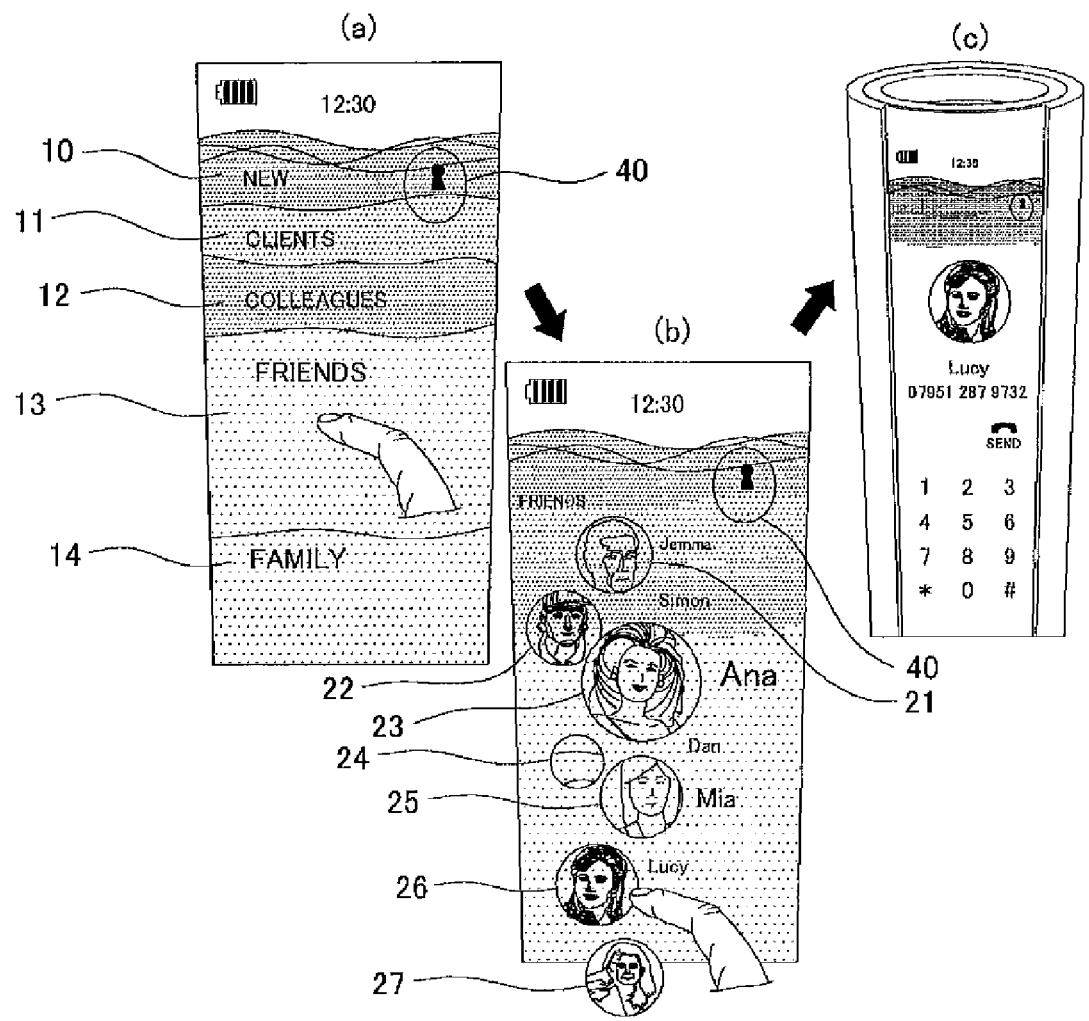
FIGS. 6A to 6C illustrate examples of a screen in which fluid movement of an object changes.

FIGS. 6A to 6C illustrate an example of a screen in which fluid movement of an object changes. For example, in FIG. 6(*a*), if the user selects a menu "FRIENDS" of phonebook 40, the object 13 corresponding to the menu "FRIENDS" largely laps and a screen of FIG. 6(*b*) is displayed. That is, the screen of FIG. 6(*b*) is an execution screen of the menu "FRIENDS." FIG. 6(*b*) is a screen for displaying lower-level menus of the menu "FRIENDS" of FIG. 6(*a*). Objects 21 to 27 displayed on the screen of FIG. 6(*b*) are objects in an implementation and are displayed with a waterdrop shape. That is, objects 21 to 27 displayed on the screen of FIG. 6(*b*) can fluidly move and correspond to different items, i.e. low-level menus, respectively of the menu "FRIENDS." If the user selects a menu "Lucy" on the screen of FIG. 6(*b*), fluid movement of an object 26 corresponding to the menu "Lucy" changes and a screen of FIG. 6(*c*), which is an execution screen of the menu "Lucy" is displayed. For example, while the object 26 corresponding to the menu "Lucy" gradually increases and is burst, or shakes in a more prominent manner, the screen of FIG. 6(*b*) is converted to a screen of FIG. 6(*c*).

Figure 7:
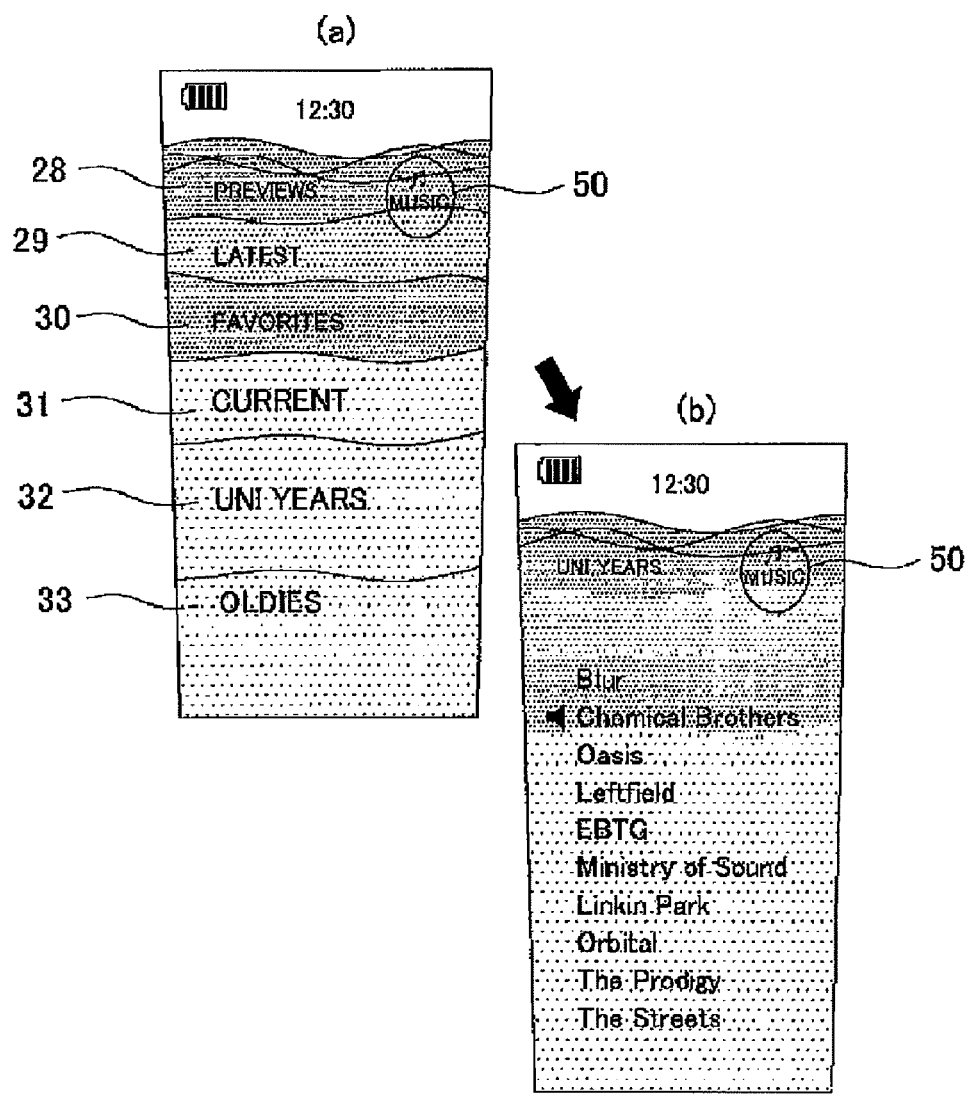
FIGS. 7A and 7B illustrate another examples of a screen in which fluid movement of an object changes.

FIGS. 7A and 7B illustrate other examples of a screen in which fluid movement of an object changes. Objects 28 to 33 displayed on a screen of FIG. 7(*a*) correspond to "PREVIEWS," "LATEST," "FAVORITES," "CURRENT," "UNI YEARS," and "OLDIES," respectively, which are low-level menus of a menu "MUSIC" 50. If the user selects the menu "UNI YEARS" on the screen of FIG. 7(*a*), while fluid movement of the object 32 corresponding to the menu "UNI YEARS" changes, a screen of FIG. 7(*b*), which is an execution screen of the menu "UNI YEARS" is displayed.

The screen of FIG. 7(*b*) displays a list of music files comprised in the menu "UNI YEARS." The list of music files displayed on the screen of FIG. 7(*b*) is displayed with a method of displaying an item in the related art without using a method of displaying an item in an implementation. However, a list of the music file can be displayed with a method of displaying an item in an implementation. The user can select or execute a specific music file in a list of music files displayed on the screen of FIG. 7(*b*).

A list of music files displayed on the screen of FIG. 7(*b*) displays an execution order of music files. That is, when all music files comprised in the list are set to be executed, the music files can be executed in an order displayed in FIG. 7(*b*). The user can change an order of music files displayed in FIG. 7(*b*) by shaking the electronic apparatus.

Figure 8:
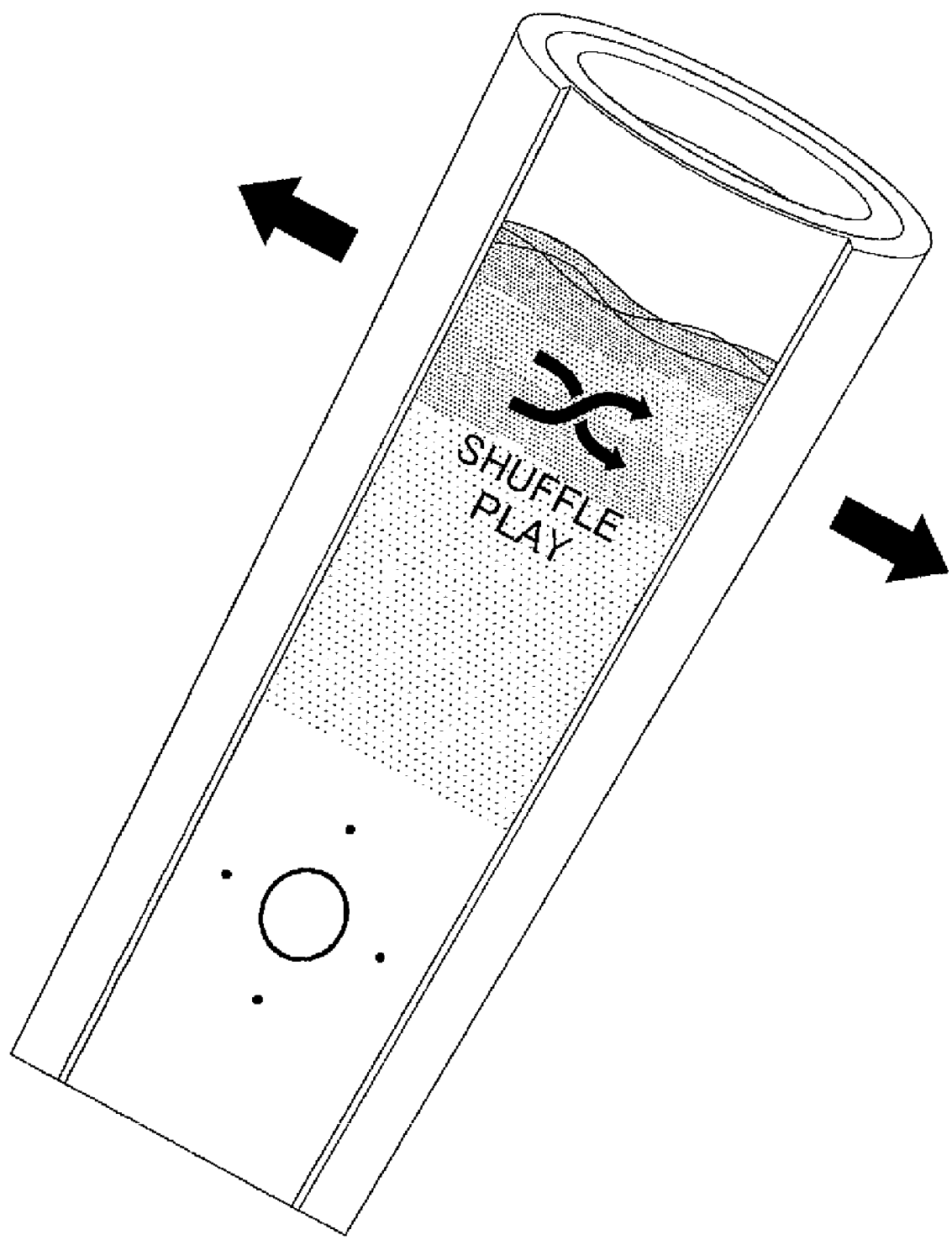
FIG. 8 illustrates an example of a displayed screen when a user shakes an electronic apparatus.

FIG. 8 illustrates an example of a displayed screen when a user shakes an electronic apparatus according to an embodiment of the invention. Here, a list is displayed on the screen of FIG. 7(*b*) is displayed with objects having a shape of a plurality of fluid layers or waterdrops. If the user shakes the electronic apparatus, objects having a shape of the plurality of fluid layers or waterdrops can be mixed. If the user stops shaking the electronic apparatus, objects having a shape of the plurality of fluid layers or waterdrops are separated from each other and displayed with an order different from an original order.

Figure 9:
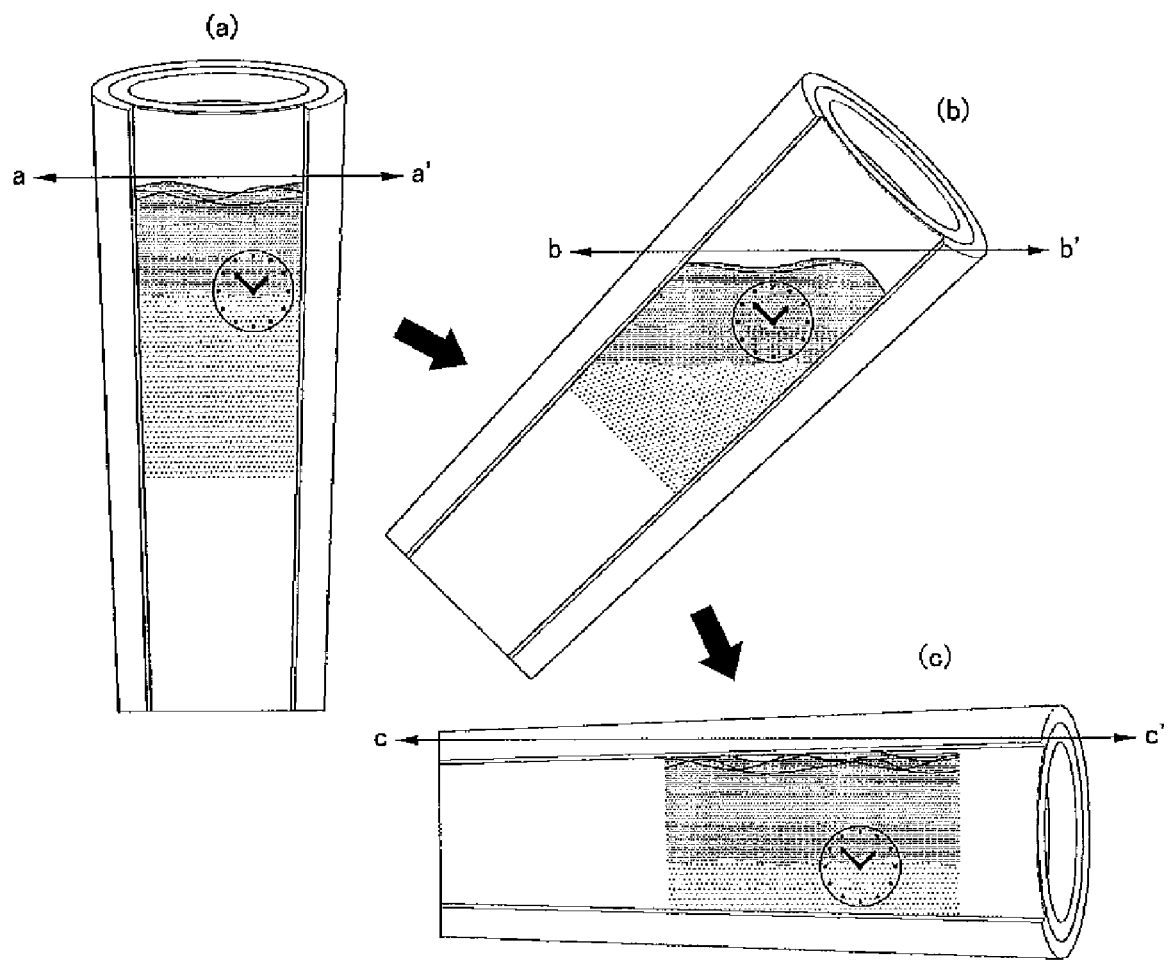
FIGS. 9A to 9C illustrate examples of a screen in which a slope of an object changes according to a slope change of an electronic apparatus.

In another embodiment, controller 150 controls the display to display the at least one object so that a slope of the at least one displayed object corresponds to a slope change of a body of the electronic apparatus. FIGS. 9A to 9C illustrate examples of a screen in which a slope of an object changes according to a slope change of an electronic apparatus. FIG. 9(*a*) shows a case where the electronic apparatus is perpendicular to a ground surface. In FIG. 9(*a*), a surface of a fluid layer, which is an object formed in approximately parallel to a ground surface (a-a'). If the electronic apparatus is inclined by a predetermined angle by the user, as in FIG. 9(*b*) from a state of FIG. 9(*a*), the controller 150 can detect a slope change of the electronic apparatus using the slope sensor 130. The controller 150 can change a slope of the fluid layer according to the detected slope change. That is, in FIG. 9(*b*), a surface of the fluid layer can be formed in approximately parallel to a ground surface (b-b'). FIG. 9(*c*) shows a state where the electronic apparatus is inclined in parallel to a ground surface. In FIG. 9(*c*), as in FIGS. 9(*a*) and 9(*b*), a surface of the fluid layer can be formed in approximately parallel to a ground surface.

Display a Residual Charge Amount of an Electronic Apparatus

Figure 10:
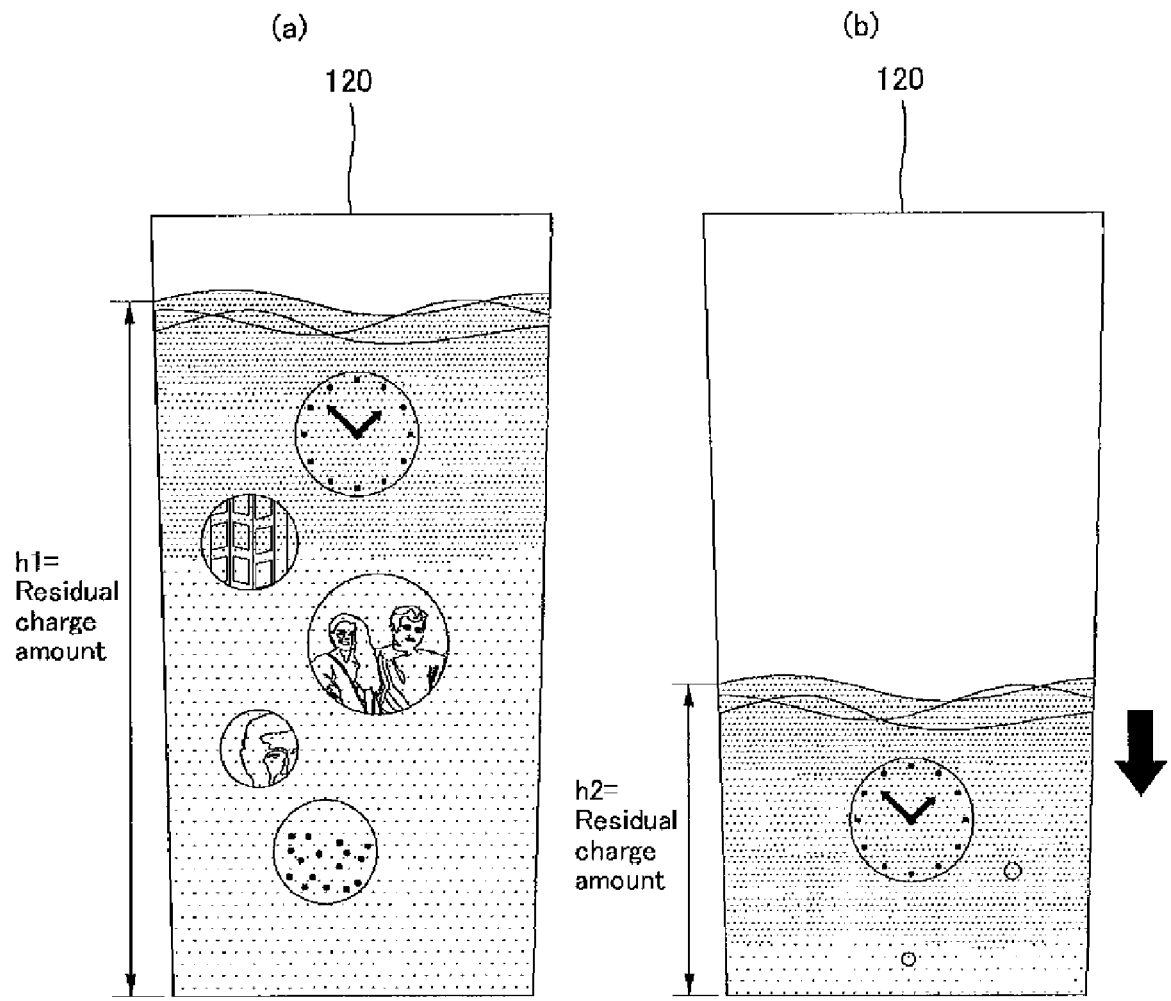
FIGS. 10A and 10B illustrate examples of a screen for displaying a residual charge amount using an object in an implementation.

The electronic apparatus in another implementation can display a residual charge amount thereof using an object that can fluidly move. FIGS. 10(*a*) and 10(*b*) illustrate examples of a screen for displaying a residual charge amount using an object in an implementation.

The controller 150 controls the display 120 to display a fluid that has a predetermined height or predetermined bulk and whose boundary dynamically moves, as shown in FIGS. 10(*a*) and 10(*b*). The controller 150 can change a height or bulk of the displayed fluid according to a change of a residual charge amount of the power supply 125. For example, 'h1' of FIG. 10(*a*) and 'h2' of FIG. 10(*b*) are a height of the fluid and display a residual charge amount of the power supply 125. FIG. 10(*b*) shows a state where a residual charge amount of the power supply 125 decreases after a predetermined time has elapsed in a state of FTG. 10(*a*). In this way, the user can easily recognize a charge state of a battery of the electronic apparatus.

Display an Approaching Degree to a Setting Time Point of a Specific Function

Figure 11:
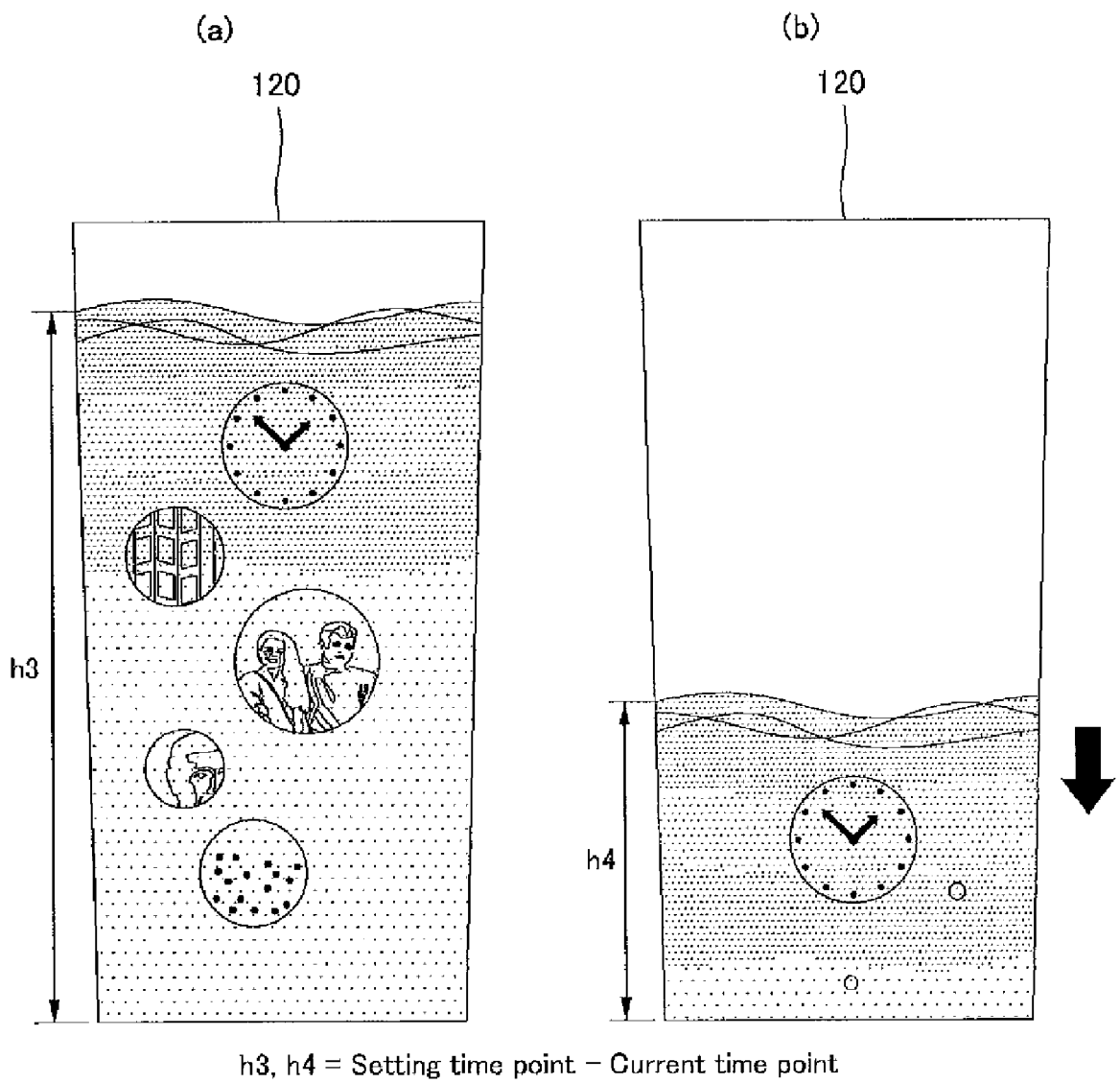
FIGS. 11A and 11E illustrate examples of a screen for displaying an approaching degree to a setting time point using an object in an implementation.

An electronic apparatus in another implementation can display a degree in which a current time point approaches to a setting time point for a specific function using an object that can fluidly move. FIGS. 11(*a*) and 11(*b*) illustrate an example of a screen for displaying an approaching degree to a setting time point using an object in an implementation.

The controller 150 controls the display 120 to display a fluid that has a predetermined height or predetermined bulk and whose boundary dynamically moves, as shown in FIGS. 11(*a*) and 11(*b*). The memory 140 stores a setting time point for a specific function. For example, a specific time point for an alarm function or a schedule management function can be set.

The controller 150 can change a height or bulk of the displayed fluid according to a difference between the setting time point and a current time point. For example, 'h3' of FIG. 11(*a*) and 'h4' of FIG. 11(*b*) are a height of the fluid and display a difference between the setting time point and a current time point. As a current time point approaches to the setting time point, the controller 150 can control a fluid displayed in FIGS. 11(a) and 11(b) to gradually fill the display 120. In this case, the display 120 sequentially changes from a state of FIG. 11(b) to a state of FIG. 11(a). Otherwise, as a current time point approaches to the setting time point, the controller 150 can control a height of a fluid displayed in FIGS. 11(a) and 11(b) to be gradually lowered. In this case, the display 120 sequentially changes from a state of FIG. 11(a) to a state of FIG. 11(b). Therefore, the electronic apparatus in an implementation enables the user to easily recognize a degree in which a current time point approaches to a setting time point for a specific function.

Display a Function Executed in a Background

Figure 12:
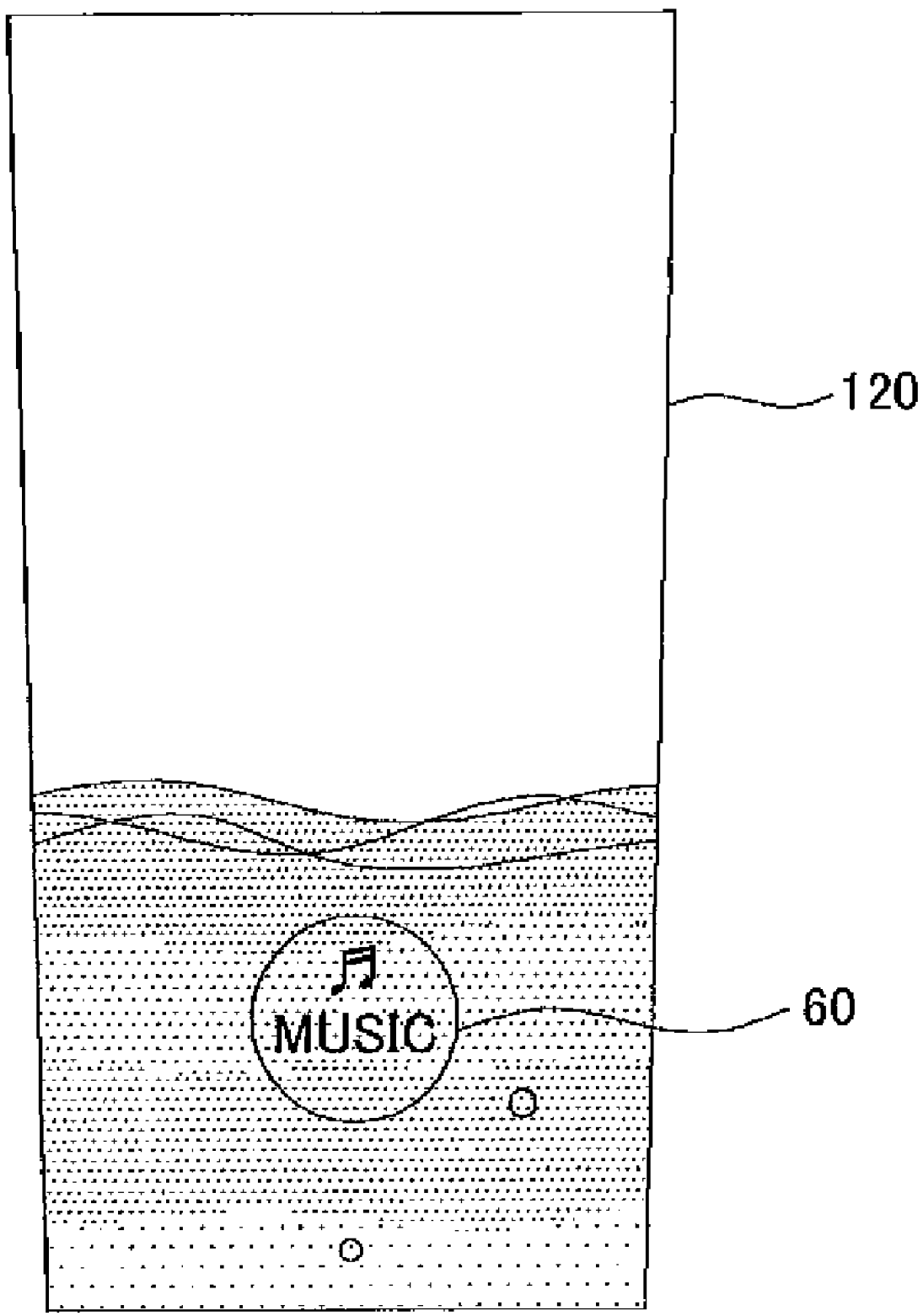
FIG. 12 illustrates an example of a screen for displaying a background function using an object in an implementation.

An electronic apparatus in another implementation can display a function executed in a background with an icon using an object that can fluidly move. FIG. 12 illustrates an example of a screen for displaying a background function using an object in an implementation.

The controller 150 controls the display 120 to display a fluid that has a predetermined height or predetermined bulk and whose boundary dynamically moves, as shown in FIG. 12. The controller 150 controls at least one icon for displaying at least one function executed in a background to be displayed at the inside of an area in which a fluid is displayed. In FIG. 12, when music plays in a background an icon 60 for notifying that music is being played is displayed at the inside of the displayed fluid.

In a multitasking mode that simultaneously performs a plurality of functions, the controller 150 controls at least one icon for displaying at least one inactivated function of the plurality of functions to be displayed at the inside of an area in which the fluid is displayed. In the multitasking mode, the controller 150 controls at least one icon for displaying at least one activated function of the plurality of functions to be displayed at the outside of an area in which the fluid is displayed. Therefore, the user can check an activated or inactivated function by viewing an icon displayed at the inside and the outside of the displayed fluid.

As described above, an electronic apparatus and a method of displaying an item using the same in an implementation have the following effects.

First, it is possible to display various items such as a menu or a file using an object that can fluidly move, such as a fluid layer or a waterdrop. Therefore, a new type of user interface that has not been provided in the related art can be provided.

Second, it is possible to display an object that can fluidly move in response to various events that may occur in an electronic apparatus. Therefore, a user can easily recognize various events occurred in an electronic apparatus.

Third, it is possible to display various functions that can be provided by the electronic apparatus using an object that can fluidly move.

The present invention may be practiced in software stored on a computer readable medium such as a disk or computer memory device. A description of how a computer works is found in "How Computers Work," Ron White, Que Publishing, 8$^{th}$ Edition, November 2005, the entire contents of which being incorporated herein by reference.

In the preceding embodiments, the fluid was described as having characteristics similar to water. However, the fluid may have a viscosity different than water, so that the objects flow slower or faster than an object in water. Similarly, colors and/or decorative items, such as fish, may be displayed in the liquid. The decorative items may be functional or non-functional. An example of a functional decorative item is the use of an image of a fish that eats an item to be deleted.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

Other features will be apparent from the description and drawings, and from the claims.

What is claimed is:

1. An electronic apparatus, comprising:
  a display configured to display a fluid that has a predetermined height or predetermined bulk and whose boundary dynamically moves;
  a power supply configured to supply power; and
  a controller configured to control the display to change the predetermined height or bulk of the displayed fluid according to a residual charge amount of the power supply.

2. An electronic apparatus, comprising:
  a display configured to display a fluid that has a predetermined height or predetermined bulk and whose boundary dynamically moves; and
  a controller configured to control the display to display at least one icon at the inside of an area in which the fluid is displayed, wherein the at least one icon indicates at least one function, respectively, executed in a background state.

3. A method of displaying an item in an electronic apparatus, the method comprising:
  displaying a fluid that has a predetermined height or predetermined bulk and whose boundary dynamically moves;
  supplying power with a power supply; and
  controlling the step of displaying to change the predetermined height or bulk of the displayed fluid according to a residual charge amount of the power supply.

4. A method of displaying an item in an electronic apparatus, the method comprising:
  displaying a fluid that has a predetermined height or predetermined bulk and whose boundary dynamically moves; and
  controlling the step of displaying to display at least one icon at the inside of an area in which the fluid is displayed, wherein the at least one icon indicates at least one function, respectively, executed in a background state.

5. A mobile terminal, comprising:
  a wireless communication unit configured to wirelessly communicate with at least one other terminal;
  a touch screen display configured to display at least one bubble-shaped object fluidly moving on the display in which the at least one bubble-shaped object includes an icon displayed within an interior of the at least one bubble-shaped object indicating a type of function executed when the at least one bubble-shaped object is selected on the touch screen display; and
  a controller configured to receive a selection signal indicating a selection of the at least one bubble-shaped object, to display another bubble-shaped object that was not previously displayed and that corresponds to a target point that is to be selected, and to execute the function when said another bubble-shaped object is selected.

6. The mobile terminal of claim 5, wherein the controller is further configured to control the display to display the at least one bubble-shaped object when a function on the mobile terminal is in a background and the controller receives a predetermined input by a user.

7. The mobile terminal of claim 5, wherein the type of function executed when the at least one bubble-shaped object is selected includes at least one of 1) a calling function for calling the at least one other terminal, 2) a viewing new message function, 3) a music player function for controlling a music player on the mobile terminal, 4) a broadcast function for performing a broadcast function on the mobile terminal, 5) a navigation function for performing a navigation function on the mobile terminal, and 6) a camera function on the mobile terminal.

8. The mobile terminal of claim 5, wherein the type of function executed when the at least one bubble-shaped object is selected includes a call function, and said another bubble-shaped object that was not previously displayed has text near said another bubble-shaped object indicating a name of a person who is being called.

9. The mobile terminal of claim 8, wherein when said another bubble-shaped object is selected, the controller is further configured to automatically call the name of the person indicated by the text near said another bubble-shaped object.

10. The mobile terminal of claim 9, wherein the controller is further configured to display a window for calling the name of the person in a full-screen.

11. The mobile terminal of claim 5, wherein the at least one bubble-shaped object includes a plurality of bubble-shaped objects, and
wherein the controller is further configured to fluidly move the plurality of bubble-shaped objects around the display.

12. The mobile terminal of claim 11, wherein the controller is further configured to fluidly move the plurality of bubble-shaped objects around the display based on a tilting or moving of the mobile terminal.

13. The mobile terminal of claim 12, wherein the controller is further configured to fluidly move the plurality of bubble-shaped objects in concert with the tilting or moving of the mobile terminal.

14. The mobile terminal of claim 5, wherein when the mobile terminal is titled from a portrait position to a landscape position, the controller is further configured to maintain a position of the at least one bubble-shaped object to be in an upright position in the landscape position.

15. The mobile terminal of claim 5, wherein the type of function executed when the at least one bubble-shaped object is selected corresponds to an upper level menu function and said another bubble-shaped object that was not previously displayed corresponds to a lower level menu function of the upper level menu function.

16. The mobile terminal of claim 5, wherein the at least one bubble-shaped object includes a plurality of bubble-shaped objects that are different in sizes.

17. A method of controlling a mobile terminal, the method comprising:
allowing, via a wireless communication unit on the mobile terminal, wireless communication with at least one other terminal;
displaying, on a touch screen display on the mobile terminal, at least one bubble-shaped object fluidly moving on the display in which the at least one bubble-shaped object includes an icon displayed within an interior of the at least one bubble-shaped object indicating a type of function executed when the at least one bubble-shaped object is selected on the touch screen display;
receiving, via a controller on the mobile terminal, a selection signal indicating a selection of the at least one bubble-shaped object;
displaying, on the touch screen display, another bubble-shaped object that was not previously displayed and that corresponds to a target point that is to be selected; and
executing, via the controller, the function when said another bubble-shaped object is selected.

18. The method of claim 17, further comprising:
displaying the at least one bubble-shaped object when a function on the mobile terminal is in a background and a predetermined input by a user is received.

19. The method of claim 17, wherein the type of function executed when the at least one bubble-shaped object is selected includes at least one of 1) a calling function for calling the at least one other terminal, 2) a viewing new message function, 3) a music player function for controlling a music player on the mobile terminal, 4) a broadcast function for performing a broadcast function on the mobile terminal, 5) a navigation function for performing a navigation function on the mobile terminal, and 6) a camera function on the mobile terminal.

20. The method of claim 17, wherein the type of function executed when the at least one bubble-shaped object is selected includes a call function, and said another bubble-shaped object that was not previously displayed has text near said another bubble-shaped object indicating a name of a person who is being called.

21. The method of claim 20, wherein when said another bubble-shaped object is selected, the method further comprises automatically calling the name of the person indicated by the text near said another bubble-shaped object.

22. The method of claim 21, further comprising:
displaying a window for calling the name of the person in a full-screen on the display of the mobile terminal.

23. The method of claim 17, wherein the at least one bubble-shaped object includes a plurality of bubble-shaped objects, and
wherein the method further comprises fluidly moving the plurality of bubble-shaped objects around the display.

24. The method of claim 23, wherein the fluidly moving step fluidly moves the plurality of bubble-shaped objects around the display based on a tilting or moving of the mobile terminal.

25. The method of claim 24, wherein the fluidly moving step fluidly moves the plurality of bubble-shaped objects in concert with the tilting or moving of the mobile terminal.

26. The method of claim 17, wherein when the mobile terminal is titled from a portrait position to a landscape position, the method further comprises maintaining a position of the at least one bubble-shaped object to be in an upright position in the landscape position.

27. The method of claim 17, wherein the type of function executed when the at least one bubble-shaped object is selected corresponds to an upper level menu function and said another bubble-shaped object that was not previously displayed corresponds to a lower level menu function of the upper level menu function.

* * * * *